April 4, 1950          B. C. COONS          2,502,779
PEAR POSITIONER FOR PEAR FEEDING MECHANISM
Filed Feb. 18, 1946          3 Sheets-Sheet 1
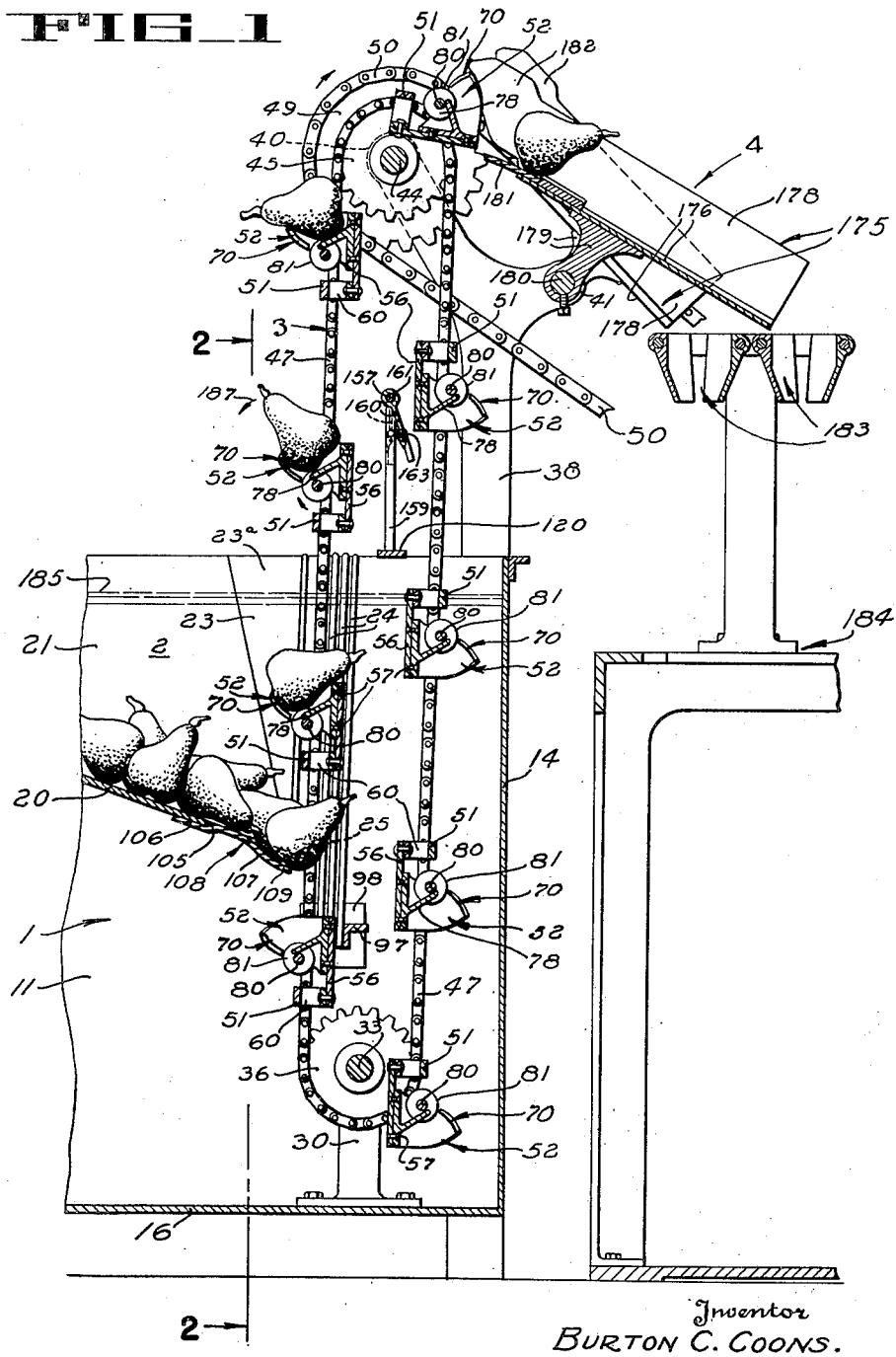
Inventor
BURTON C. COONS.
By Philip A. Minnis
Attorney

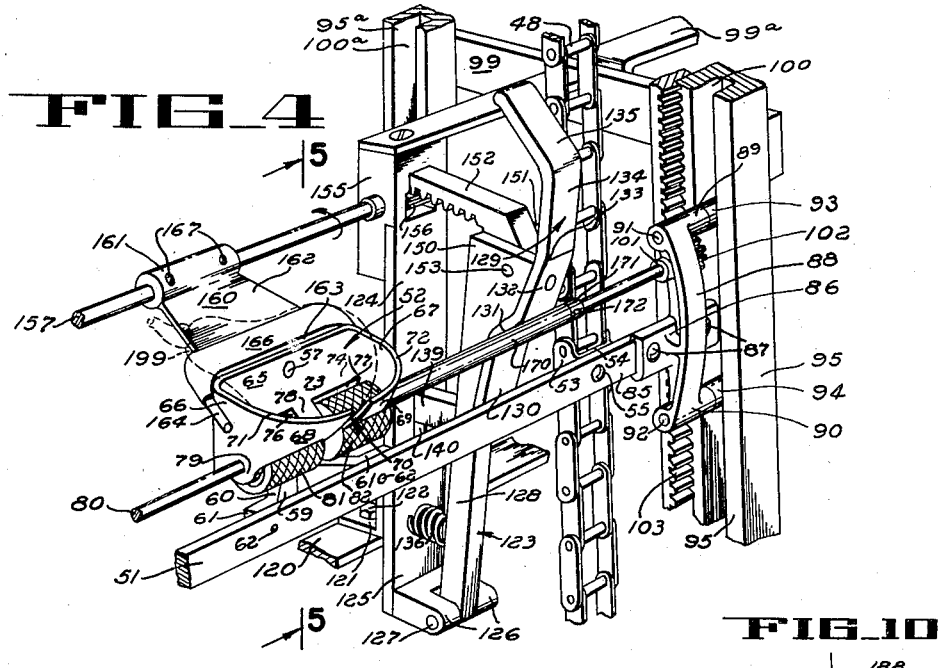
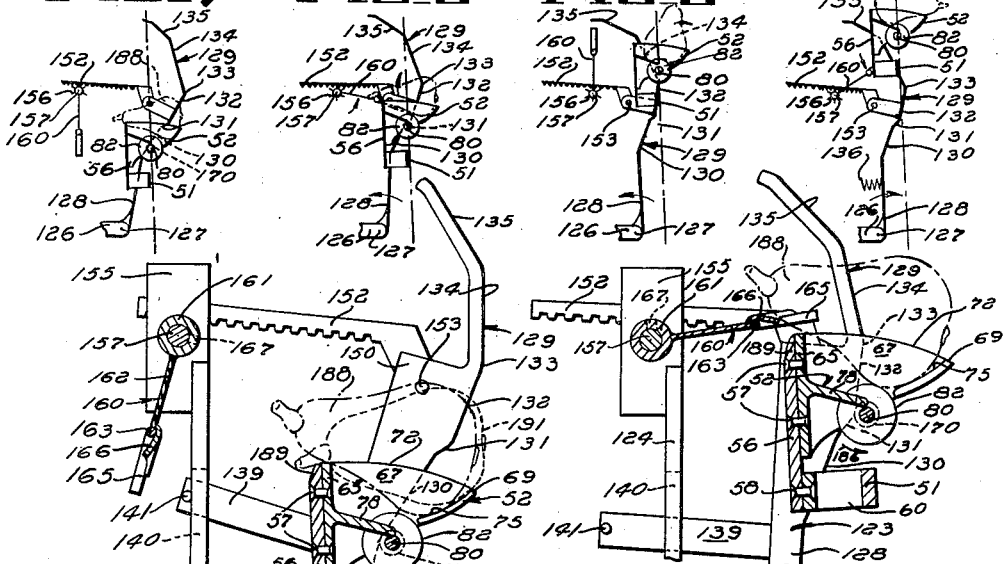

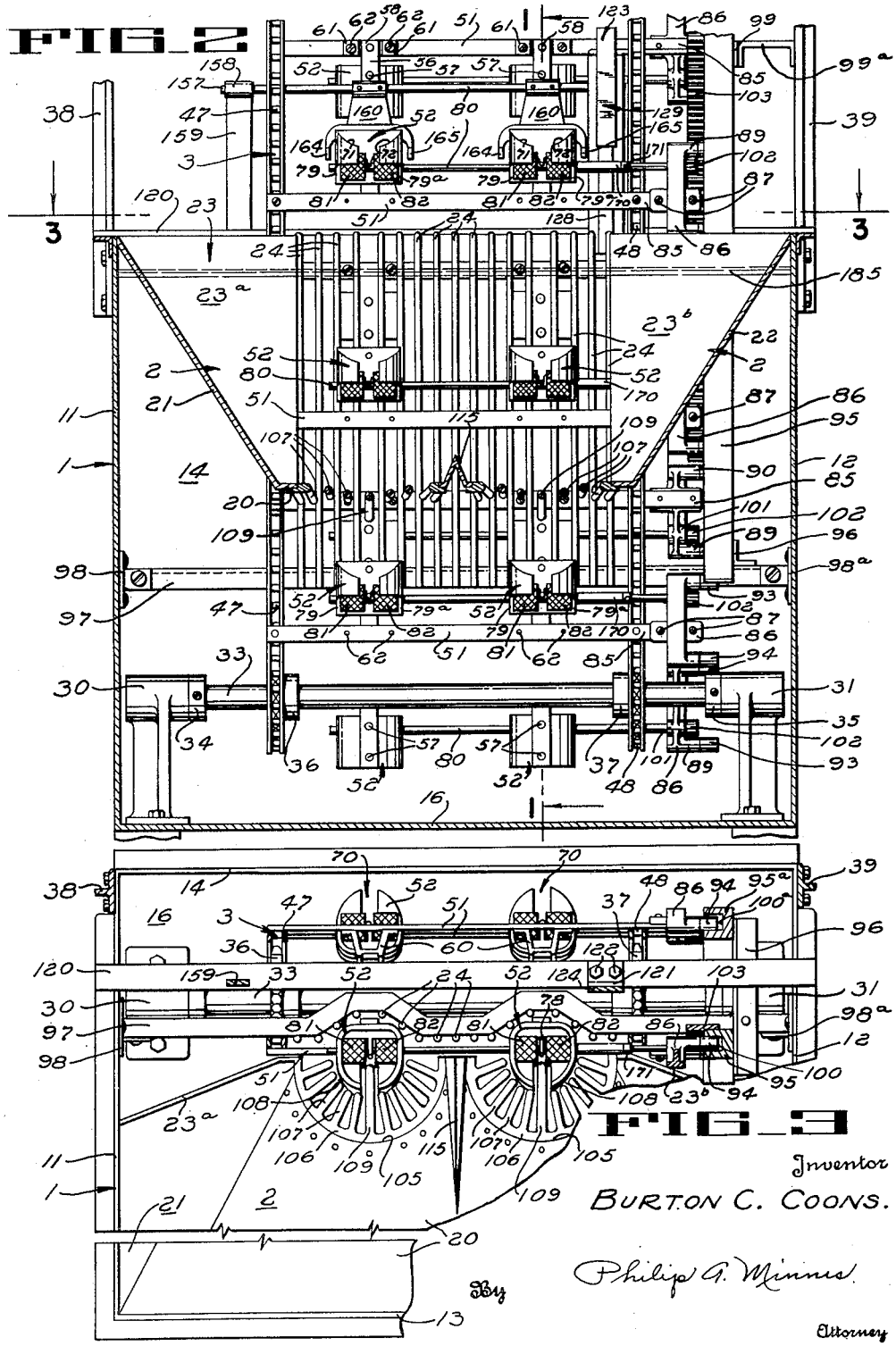

Patented Apr. 4, 1950

2,502,779

UNITED STATES PATENT OFFICE 2,502,779

PEAR POSITIONER FOR PEAR FEEDING MECHANISM

Burton C. Coons, San Jose, Calif., assignor to Food Machinery and Chemical Corporation, a corporation of Delaware Application February 18, 1946, Serial No. 648,344

15 Claims. (Cl. 198—33)

This invention relates to improvements in a pear feeding mechanism for orienting pears for discharge in a predetermined manner.

One object of the present invention is to provide a pear positioning mechanism for a pear feeding and orienting apparatus.

Another object is to provide a pear positioner for pear feeding apparatus for automatically shifting pears from an undesirable into a predetermined position in which the pears may readily be oriented during their conveyance through the feeding apparatus.

Other objects and advantages of the present invention will become apparent from the following description and drawings in which:

Fig. 1 is a vertical section through a pear feeding mechanism embodying the present invention and taken along line 1—1 in Fig. 2.

Fig. 2 is a section of Fig. 1 taken along line 2—2 thereof.

Fig. 3 is a horizontal section of the machine taken along line 3—3 in Fig. 2.

Fig. 4 is a fragmentary perspective view of a portion of the machine illustrating a feed cup and operating mechanism associated therewith.

Fig. 5 is a section of Fig. 4 taken along line 5—5 thereof.

Fig. 6 is a section similar to Fig. 5 with parts thereof shown in a different position.

Figs. 7, 8, 9, and 10 are diagrammatic views, similar to Figs. 5 and 6, illustrating the operation of the feed cup and mechanism associated therewith.

In general the pear feeding mechanism embodying the present invention comprises a tank 1, a hopper 2, an elevator mechanism 3 and a discharge chute assembly 4. The pears are deposited promiscuously into the hopper 2 which guides them toward the elevator mechanism 3 which in turn feeds the pears individually at predetermined intervals into the discharge chute assembly 4. As the pears are conveyed from the hopper 2 to the discharge chute assembly 4, they are oriented by the elevator mechanism 3 for discharge therefrom in a predetermined manner. While the pears are further oriented by the discharge assembly 4, it forms no part of the present invention except to serve as a place of reception for the individual pears discharged in a predetermined manner from the elevator mechanism.

The tank 1 (Figs. 1, 2, and 3) comprises side walls 11 and 12, a front wall 13, a rear wall 14, and a bottom 16. The hopper 2 is mounted within the tank 1 between the side walls 11 and 12 and comprises a bottom wall 20, side walls 21 and 22 and a rear wall 23 spaced from the rear wall 14 of the tank. The rear wall 23 is formed by rear wall sections 23a and 23b adjacent the sides of the tank and a plurality of spaced vertical rods 24 arranged between the sections 23a and 23b.

The bottom wall 20 of the hopper is declined from the front wall 13 of the tank toward the rear wall 23 and has its rear edge 25 disposed a substantial distance above the bottom 16 of the tank and spaced from the rods 24, as shown in Fig. 1. The side walls 21 and 22 of the hopper are declined toward the declining bottom wall 20 of the hopper and the portions 23a and 23b of the rear wall of the hopper are disposed at an angle with respect to the rear edge 25 of the hopper to guide the pears toward the rear edge 25 thereof.

Positioned within the tank and secured to the bottom 16 thereof adjacent the rear wall 14 are bearings 30 and 31 within which a transverse shaft 33 is rotatably mounted which is provided with retaining collars 34 and 35 (Fig. 2). The shaft 33 has sprocket wheels 36 and 37 spaced from each other thereon and keyed to the shaft 33 adjacent the respective bearings 30 and 31.

Secured to the side walls 11 and 12 of the tank adjacent the rear wall 14 thereof are standards 38 and 39 each provided with bearings 40 and 41. Rotatably mounted within the bearings 40 of the standards 38 and 39 is a transverse elevator drive shaft 44. The shaft 44 has a pair of sprocket wheels 45 thereon and each keyed to the shaft 44 vertically above the respective sprockets 36 and 37. Trained around the sprockets 36 and 45, as seen in Fig. 1, is an endless elevator chain 47 and likewise trained around the sprocket 37 and the sprocket 45 thereabove, not shown, is an endless elevator chain 48.

Keyed to the shaft 44 is a sprocket wheel 49 having a sprocket chain 50 associated therewith which is driven either by a separate motor or directly by the fruit preparation or processing machine with which the feed mechanism of the present invention is adapted to be used. Secured to the elevator chains 47 and 48 at equally spaced intervals are a plurality of pear receiving units each comprising a transverse bar 51 having a plurality of cups or buckets 52 secured thereto. To permit attachment of the transverse bars 51 to the sprocket chains 47 and 48, the latter are provided at equal intervals with links 53 (Fig. 4) having a web portion 54 to which the transverse bars 51 are secured by means of screws 55. The sprocket wheel 49 is driven clock-wise, as seen in Fig. 1, and the forward reaches of the elevator chains 47 and 48 are disposed to travel in a plane to carry the transverse bars 51 through the space between the rear edge 25 of the hopper and the vertical rods 24 to the rear thereof.

In the present instance, each pear receiving unit is shown with two cups to each bar but it is apparent that the number of cups may be varied as desired. Each cup 52 is secured to a back bar 56 by rivets 57 and the lower end of each back bar is secured by a rivet 58 to the bight portion 59 of a separate U-shaped bracket 60. The legs of each U-shaped bracket 60 are provided with flanges 61 which are secured by screws 62 to the rear face of the transverse bars 51. The cups 52 of each unit are arranged on the transverse bars 51 so as to provide lines of cups traveling in a vertical path.

Each of the cups 52 (Figs. 4 and 5) comprises a rear wall 65 and side walls 66 and 67 terminating in front walls 68 and 69, respectively, which are curved toward and spaced from each other, as shown at 70. The upper faces of the side and front walls 66, 67 and 68, 69 of each cup form continuous edges 71 and 72, respectively, which are gradually forwardly declined toward the free space 70 therebetween. Each cup 52 is further provided with a bottom 73 having a rearwardly inclined portion 74 adjacent the rear wall 65 and a forwardly inclined and coved portion 75 adjacent the front walls 68 and 69. The bottom 73 of each cup is cut away at 76 and 77 (Fig. 4) separating the rearwardly and forwardly inclined portions 74 and 75 in the valley formed therebetween. The rearwardly inclined portion 74 is provided with a downwardly extending tongue 78 which terminates in the valley of the cup, as shown in Fig. 5.

The side walls 66 and 67 of the cup 52 each have a bearing 79 and 79a thereon below the bottom wall 73 of the cup. Rotatably mounted in these bearings of both cups on each transverse bar 51 is a shaft 80. Fixed to this shaft 80 below the bottom of each cup are pear positioning rolls 81 and 82 spaced from each other by the downwardly extending tongue 78 and projecting partially through the cut-out portions 76 and 77, respectively, in the bottom of the cup. The peripheral surface of each roll is knurled, as shown in Fig. 4, and extends a sufficient distance above the bottom of the cup, as shown in Fig. 5, so as to engage the bulb portion of a pear supported therein. The tongue 78 extends downwardly between the rolls 81 and 82 toward the shaft 80 to prevent entry of the stem of a pear between the rolls behind the shaft 80.

As seen in Figs. 2, 3, and 4, one end 85 of each transverse bar 51 extends beyond the elevator chain 48 and has a guide bracket 86 secured thereto by screws 87. Each guide bracket 86 comprises a bridge portion 88 disposed perpendicular to the transverse bar 51 and has a bearing 89 at its upper end and a similar bearing 90 at its lower end. Fixed within the bearings 89 and 90 are outwardly extending stud shafts 91 and 92, respectively, upon which guide rolls 93 and 94, respectively are rotatably mounted.

A guide rail 95 is mounted parallel to the ascending reach of the chain 48 and a similar guide rail 95a is mounted parallel to the descending reach thereof. The lower ends of the guide rails 95 and 95a are welded to a bracket 96 which is supported on and secured to the upper flange of an angle iron 97. The angle iron 97 extends transversely of the tank 1 between the guide rails 95 and 95a and is supported at its ends on brackets 98 and 98a secured to the side walls 11 and 12, respectively, of the tank. The upper ends of the guide rails are secured to a cross strap 99 supported by a bracket 99a which is secured to the standard 39, as seen in Fig. 2.

Each guide rail 95 and 95a is in the form of a channel 100 and 100a, respectively, to receive and guide the guide rollers 93 and 94 of the guide bracket 86. The flanges of the channels 100 and 100a are flared outwardly at their roller receiving ends to permit entry of the rollers 93 and 94 thereinto as the transverse bars 51 and guide brackets 86 carried thereby travel around the lower and upper sprocket wheels as the case may be. The opposite ends of the guide channels 100 and 100a terminate a sufficient distance from the adjacent sprocket wheels to permit the guide brackets 86 to commence their turnabout relative to the sprocket wheels.

Each guide bracket 86 is provided with a bushing 101 through which extends the shaft 80 of the associated pear receiving unit and secured to the outermost end of the shaft 80 of each unit is a pinion 102 which meshes with a rack bar 103 supported on the rearmost flange of the guide rail 95, as seen in Fig. 4. The lower end of the rack bar 103 is just above the rear edge 25 of the hopper so that as each pear receiving unit is elevated through the hopper, the pinion 102 associated therewith engages the rack 103 to rotate the shaft 80 and the knurled rolls 81 and 82 of each unit. The rack bar 103 terminates at the upper end of the guide channel so that knurled rolls 81 and 82 are continually rotated during the elevation of the cups 52 from the hopper to the sprockets 45.

Referring now to Figs. 2 and 3, the bottom wall 20 of the hopper 3 is provided with semi-circular cut-out portions 105 at its rear edge 25 and in the path of each line of elevating cups 52. Mounted on the bottom 20 of the hopper and extending into the semi-circular cut-out portions 105 thereof are semi-circular grate structures 106 each one of which is provided with a plurality of radially disposed fingers 107 arranged to form semi-circular openings 108 in the bottom of the hopper to permit passage of cups 52, as seen in Figs. 1 and 2. A long finger 109 of each grate structure 106 is provided to extend into the space 70 between the front wall portions 68 and 69 and the knurled rolls 81 and 82 of each cup 52 during its travel past the same. The fingers 109 prevent falling of the fruit from the hopper 20 through the openings 108 into the bottom of the tank 1.

The bottom wall 20 of the hopper 2 is provided with a partition 115 intermediate adjacent grate structures 106. These partitions 115 are of inverted V-shaped configuration in cross-section, as shown in Fig. 2, to guide the fruit toward the openings 108 in the same manner as the declining side walls 21 and 22 of the hopper.

The vertical rods 24 forming a portion of the rear wall 23 of the hopper are positioned behind the elevating runs of the elevator chains 47 and 48 and are solely supported at their lower ends on the transversely disposed angle 97 hereinbefore mentioned to which they are secured. The rods 24 are closely spaced to provide a barrier at the rear side of the hopper from the rear edge 25 thereof to the top of the tank 1 to thereby prevent falling of the fruit from the hopper into the rear space between the hopper and the rear wall 14 of the tank.

A plate 120 extends between the ascending and descending reaches of the elevator chains 47 and 48 transversely of the tank 1 and is supported at its ends on the top edge of the side walls 11 and 12 of the tank. Mounted on the plate 120 adjacent the elevator chain 48 is a bracket 121 which is bolted at 122 to the plate 120. Welded to this bracket 121 and forwardly of the plate 120 is a cam unit 123, best seen in Fig. 4.

The cam unit 123 comprises a stationary base 124 having its lower end 125 extending below the plate 120 and provided with forwardly extending spaced bearings 126. Mounted in these bearings is a shaft 127 on which the lower end of a cam arm 128 is pivotally mounted. This cam arm extends upwardly from the bearings 126 and has its upper portion provided with camming surface 129 of irregular configuration which faces forwardly relative to the machine. The camming surface 129 has several gradual acclivities 130 and 132 separated by a steep acclivity 131 all below an apex portion 133 of the camming surface 129 and the upper portion of the camming surface has a gradual declivity 134 and a steep declivity 135.

The cam arm 128 is normally urged toward the forward end of the machine (clock-wise Figs. 4 and 5) by a compression spring 136. One end of the spring 136 is seated against the base 124 on a knob 137 thereon and the other end of the spring bears against the cam arm 128 and is held in place by a knob 138 thereon. A guide bar 139 is rigidly secured to the rear face of the cam arm 128 and extends through a guide slot 140 in the base 124. A pin 141 is carried by the free end of the guide bar 139 and protrudes laterally from the same to engage the rear face of the bar 124. The forward movement of the cam arm under the influence of the compression spring 136 is thereby limited to normally dispose the camming surface 129 in the path of movement of the shaft 80 and transverse bars 51 associated with each unit of feed cups 52 as they are elevated.

The cam arm 128 is provided on its rear face with spaced bearings 150 and 151 within which is disposed the forward end of a rack bar 152 pivotally connected to the bearings 150 and 151 by a shaft 153 extending therebetween. The free end of the rack bar 152 extends into and through a guide block 155 secured to the upper end of the base 124 of the cam unit. This guide block 155 is cut-out below the rack bar 152 and has a pinion 156 arranged therein in meshing relation with the teeth of the rack bar 152. The pinion 156 is secured to a shaft 157 rotatably mounted in the bearing block 155 and extending transversely of the machine into a bearing 158 on a standard 159 supported on the plate 120 adjacent the elevator chain 47.

An arm 160 is arranged on the shaft 157 in alignment with the vertical path of movement of each line of elevating cups 55 in the present disclosure there being two such arms. Each arm 160 comprises a hub portion 161 having a radially extending web 162 at the free end of which a yoke 163 is formed with extending legs 164 and 165. The base of the yoke 163 has a skirting 166 the sides of which merge with the inner ends of the legs 164 and 165 to form a pear engaging face on the yoke.

The hub 161 of each arm 160 is secured to the shaft 157 by set screws 167 so that the web 162 and yoke 163 normally extend downwardly and rearwardly relative to the shaft 157 when the cam arm 128 is disposed in its normal position by the compression spring 136, as seen in Fig. 5.

The camming surface 129 is adapted to be engaged by a roller 170 arranged on the shaft 80 of each unit of cups associated with the elevator mechanism 3. The roller 170 is rotatable relative to the shaft 80 and is retained in cam engaging position by a retaining collar 171 secured to the shaft 80 by a set screw 172, as shown in Fig. 4.

The discharge chute assembly, as seen in Fig. 1, is more fully shown and described in my copending application Serial No. 566,694 for Pear feeding and orienting apparatus, filed December 4, 1944. Briefly, the discharge chute assembly 4 comprises a plurality of open ended chutes 175 arranged to receive the fruit from the cups 52 as they are discharged at the upper end of the elevator mechanism 3.

These chutes 175 each have a bottom wall 176 and side walls 178 and are provided with brackets 179 supported upon a transverse shaft 180 spanning between the standards 38 and 39 hereinbefore mentioned and having its ends supported in the respective bearings 41 thereof. The chutes 175 have their upper ends disposed to receive the pears from the cups 52 as the latter are inverted during travel of their associated web links 53 on the elevator chains 47 and 48 around the sprocket wheels 45 on the elevator drive shaft 44. The upper end of each chute 175 is spaced rearwardly from the descending reach of the elevator chains 47 and 48 to permit downward movement of the cups 52. The upper end of each chute 175 is provided with a tongue 181 which extends into the free spaces 70 of the cups 55 as the latter pass the chute 175.

The side walls 178 of each chute also extend upwardly toward the elevator mechanism 3, as shown at 182, to deflect the pears into alignment with the chute 175 as they are discharged from the cups 52. The chute 175 is supported in a rearwardly declined position so that pears received at the upper end thereof will gravitate down the chute and will be oriented while rolling down the chute for discharge therefrom stem end first. The lower ends of the chutes 175 are arranged above feed receptacles 183 forming a part of a pear preparation or processing machine 184 so that the pears are discharged from the chutes 175 into the receptacles 183 stem end down.

The pears to be oriented and fed by the machine of the present invention are dumped into the hopper 2 in a promiscuous mass. The pears in the hopper are guided as shown in Fig. 1 by the declining bottom 20, side walls 21, 22 and partitions 115 of the hopper toward the semicircular grate structures 106. The pears accumulated upon the grates 106 are removed from the hopper one after another by the cups 52 elevated through the hopper by the elevating mechanism 3.

In order to prevent bruising of the pears as they are dumped into the hopper 2 and to prevent bridging of the fruit therein, the tank 1 and hopper 2 are filled with water to the approximate level shown at 185 in Figs. 1 and 2. Since the pears are slightly heavier than the water, they will sink therein and gravitate to the lower region of the hopper. Due to the buoyant effect of the water on the pears, the mass thereof accumulated at the lowermost region of the hopper, although not received within the cups 52 for elevation thereby, are easily pushed away therefrom without damaging or bruising the pears.

This size of each cup 52 is such as to accommodate only one pear and, consequently, only a single pear is removed from the hopper by each cup elevated through the same. If a pear enters a cup bulb portion first during elevation of the cup through the mass of pears, such pear will rest in the cup in contact with one or both knurled rolls 81 and 82. When a pear is so disposed in a cup its stem end will project from the cup in any angular position it may assume. A pear so disposed within a cup is lifted through the mass of pears out of the hopper 2 while the remaining fruit within the hopper slides out of the path of the cup 52 and settles toward the opening 108 in the bottom of the hopper for removal therefrom by a succeeding cup.

During the upward travel of the transverse bars 51 the guide rollers 93 and 94 are guided by the channels 100 of the guide rail 95. Therefore, the guide bracket 86 and transverse bars 51 associated therewith are supported in such a manner as to firmly hold the cups 52 in fruit supporting position during their elevation.

After the pears have been lifted out of the lower region of the hopper by the cups 52, the pinion 102 of the shaft 80 associated with each unit of cups engages the teeth of the rack bar 103. The pinion 102 is thereby rotated counterclockwise, as seen in Fig. 4, causing a corresponding rotation of the shaft 80 and knurled rolls 81 and 82 in the direction of the arrow 186 in Figs. 5 and 6 until the pinion 102 rides out of engagement with the upper end of the rack 103.

From the foregoing it is apparent that a pear supported in the cup 52 with a portion of the pear in frictional contact with the knurled periphery of either or both of the rolls 81 and 82 will be rotated thereby and turned on its bulb portion while the same is confined within the cup. Consequently, the rotation of the rolls 81 and 82 clockwise, as seen in Fig. 1, will cause a counterclockwise turning of a pear in the direction of arrows 187 in Fig. 1. The stem end of such pear is thereby swung toward the free ends of the front walls 68 and 69 of the cup until the pear rests in the cup with its stem end between the free ends of the front walls 68 and 69 and pointing outwardly from the cup, as shown in the uppermost cup 52 on the elevating reach of the elevator chains 47 and 48 in Fig. 1.

If a pear is supported in the cup 52 with its stem end resting on either of the declined edges 71 or 72 at the side walls 66 and 67, respectively, of the cup and the bulb portion of such pear is frictionally contacting either of the knurled rolls 81 and 82, the rotation of the latter causes a rolling of the pear while the bulb portion thereof is confined within the cup 52. Therefore, the stem end of such pear will roll down the gradually declined edge 71 or 72 of the side wall of the cup thereby simultaneously turning and swinging the pear until its stem end comes to rest between the free ends of the front walls 68 and 69 of the cup.

It sometimes happens that a pear enters the cup stem end first with the heavier or bulb portion of the fruit projecting from the cup. In such instances, the pear will usually be pushed out of the cup by other pears in the hopper 2 as the cup is elevated through the promiscous mass of pears therein and another pear will eventually enter the cup bulb end first.

In the above example it will be noted that the pear is ultimately disposed in the cup with its stem blossom axis substantially aligned with respect to the plane of travel of the cups 52. Consequently, as the cup is inverted at the upper end of the elevator mechanism 3, the pear so aligned will be discharged from the cup into the discharge chute 175 with its stem blossom axis substantially aligned with the longitudinal axis of the chute so that the pears will easily turn while descending down the chute for discharge therefrom stem end first.

Occasionally a pear received by a cup 52, as it is elevated through the hopper 2, will be so positioned in the cup that the bulb portion of such pear is firmly seated within the cup but not in contact with the knurled rolls 81 and 82. For instance, the pear 188 shown in dot-dash lines in Fig. 5 has its bulb portion resting in the coved portion 75 of the bottom 73 of the cup and its stem end resting upon the upper edge of the rear wall 65 of the cup. Such pear 188 is out of contact with the knurled rolls 81 and 82 and, therefore, cannot be turned thereby.

However, as the cups 52 are elevated the rollers 170 on the shafts 80 associated therewith successively engage the camming surface 129 of the cam unit 123 to operate the latter once as each unit of cups pass the same. When a roller 170 associated with a unit of cups 52 begins to engage the acclivity 130 of the camming surface 129, the arm 160 is in its normal position, as shown in Fig. 5. The roller 170 initially engages the acclivity 130 to quickly depress the cam arm 128 against the action of its spring 136, as shown in Fig. 7. In passing the acclivity 130 the roller 170 begins to engage the steep acclivity 131, as seen in Fig. 8. The rack bar 152, therefore, first quickly rotates the pinion 156 and shaft 157 to thereby quickly swing the arm 160 to the dotted line position in Fig. 1 out of the path of the decending cup 52 on the back reaches of the elevator chains 47 and 48 and thereafter moves the arm 160 into the position seen in Fig. 8.

As the roller 170 is raised from the position shown in Fig. 8 to that shown in Fig. 6 it passes the steep acclivity 131 of the camming surface to quickly swing the arm 160 in the direction of travel of the cup associated with the roller 170. It will be noted that cup 52 is therefore elevated in timed relation with the upward stroke of the arm 160. The stroke of the arm 160 is so timed that tne skirting 166 of the arm 160 will sweep past the upper edge of the rear wall 65 of the cup and ahead of the same as the cup is elevating. The back bar 56 to which the cup is secured has a beveled edge 189 on the rear side of its upper edge to assure clearance of the skirting 166 as the latter sweeps past the same.

Therefore, as the roller 170 passes the steep acclivity 131 and advances toward engagement with the more gradual acclivity 132, the kicker arm swings ahead of the cup. In other words, the arm 160 quickly moves from the position shown in Fig. 8 wherein the skirting 166 is about to engage or is contacting the neck end of the pear 188 to the position shown in Fig. 6 to quickly raise the neck end of the pear 188. The skirting 166, therefore, suddenly lifts the neck end of the pear 188, as seen in Fig. 6, while dragging the bulb end of the pear further into the cup causing the bulb portion of the pear to slide down the coved portion 75 of the bottom wall 73 of the cup. The bulb portion of the pear 188 is thereby lowered into contact with the knurled rolls 81 and 82 and will thereafter be influenced thereby. Movement of the roller 170 against the gradual acclivity 132 slows down the movement of the arm 160 while the skirting 166, still ahead of the cup, swings upwardly to assist the knurled rolls 81 and 82 in turning the pear.

As the cup 52 passes the cam unit 123 the roller 170 passes over the apex 133 of the camming surface 129, an shown in Fig. 9, to completely depress the cam arm 128 and swing the arm 160 to its extreme raised position. The cup 52 is, therefore, free to pass the arm 160 while the pear 188 is further influenced by the knurled rolls 81 and 82 thus turning the pear clockwise, as seen in Fig. 9.

During elevation of the cup 52 from the position shown in Fig. 9 to that of Fig. 10, the pear will have been swung within the cup by the knurled rolls 81 and 82 so that the neck end of the pear lies between the free ends of the front walls 68 and 69 of the cup. Simultaneously therewith the roller 170 disengages the camming surface 129 which is now engaged solely by the transverse bar 51. The bar 51 in riding over the gradual declivity 134 of camming surface 129 permits only a gradual return of the cam arm 128 under the influence of its compression spring 136. Consequently, the arm 160 slowly returns, clockwise Fig. 10, until the skirting 166 will clear the lower end of both the cup supporting bar 59 and the bracket 60. Thereafter, the bar 51 moves past the remaining steep declivity 135 of the camming surface 129 permitting an accelarated return movement of the cam arm 128 by the spring 136 and finally the transverse bar 51 completely disengages the camming surface. The cam unit thereupon assumes its normal position with the arm 160 in the position shown in Fig. 5 in readiness for operation by the roller 170 associated with the next succeeding unit of elevating cups 52.

In the example just described concerning the pear 188, the pear was positioned with its neck portion overhanging the rear wall 65 of the cup. However, it will be apparent that a pear having its bulb portion out of contact with the knurled rolls 81 and 82, but firmly seated within the cup, might have its stem blossom axis extending laterally therefrom so that the stem end of the pear overhangs either side wall 66 or 67 thereof as shown by the pear 199 in Fig. 4. In such instance, one or the other forwardly extending leg 164 or 165 of the yoke 163 will engage the overhanging neck end of the pear to flip the latter upwardly and thereby cause the bulb portion of such pear to slide further down into the cup into contact with the knurled rolls 81 and 82 therein. Such pear is thereafter rolled within the cup by the influence of the knurled rolls 81 and 82 in a direction to cause the neck end of the pear to gravitate down the declined upper edges 71 or 72 until the neck end of the pear rests on the free ends of the front wall 68 and 69 of the cup.

In rare instances a pear is likely to be supported on the cup 52 in the manner illustrated by the pear 191 in Fig. 5. The bulb portion of the pear 191 is so seated on the free edges of the front wall 68 and 69 of the cup and its neck end is so resting on the rear wall 65 thereof as to be firmly supported thereby. Consequently, when the cup passes the cam unit 123 and operates the same, as described above, the skirting 166 of the kicker arm 160 in moving from its position as shown in Fig. 7 to that of Fig. 6, first engages the stem of the pear 191 and then suddenly raises the stem end of the pear. This sudden movement of the pear causes the bulb end thereof to shift downwardly on the coved portion 75 of the cup while turning the pear clockwise in Fig. 5. The remainder of the upward stroke of the kicker arm further swings the pear about its bulb portion until the latter contacts the knurled rollers 81 and 82.

Thereafter the pear will be turned by the knurled rolls until the neck end of the pear rests on the free ends of the front walls 68 and 69 of the cup.

From the foregoing it will be noted that pears carried by the cups 52 with a portion thereof overhanging either the rear or side walls of the cup are usually out of contact with the knurled rolls 81 and 82 and, therefore, will not be influenced thereby. However, in such instances the overhanging portion of such pears will be engaged by the arm 160 and, therefore, will be shifted thereby into a position where a portion of the periphery of such pear rests upon the knurled rolls 81 and 82. Such a pear will, therefore, be positively turned within the respective cup 52 until its neck end rests on the free ends of the front walls 68 and 69 of the cup. Consequently, when each cup 52 is thereafter inverted at the upper end of the elevator mechanism 3 the pear will be disposed relative to the cup with its stem blossom axis in alignment with the longitudinal axis of the discharge chute 175. Therefore, the pear will be deposited into the discharge chute 175 in a manner to be oriented thereby for discharge therefrom stem end first into the feed receptacle 183 of the pear preparation or processing machine.

While the foregoing description of the mechanism and its operation refers to a specific form of construction for carrying out this invention, it is to be understood that various modifications thereof may be made without departing from the spirit of the invention. I, therefore, desire to avail myself of all modifications and alterations within the scope of the accompanying claims.

What I claim as new and desire to protect by Letters Patent is:

1. A pear feed comprising a receptacle adapted to receive a pear bulb end first therein and having one wall thereof formed to receive and support the neck end of a pear to cause said pear to assume a predetermined oriented position relative to said receptacle, means in said receptacle for contacting the bulb end of the pear for turning said pear to cause the neck end thereof to be received and supported by said one wall of the receptacle, and means operatively associated with the receptacle, for engaging the neck end of a pear disposed in said receptacle with its bulb end out of contact with said pear turning means and its neck end out of contact with said one wall of the receptacle for shifting said pear into contact with said pear turning means.

2. A pear feed comprising a moving receptacle adapted to receive a pear from a promiscuous mass thereof, pear contacting means in the bottom of said receptacle for turning a pear received thereby into oriented position therein with its stem end extending over the front wall of the receptacle, and means disposed adjacent the path of movement of said receptacle and operable as the latter passes the same to engage a portion of a pear extending from said receptacle other than over the front wall thereof to thereby shift the pear in said receptacle into contact with said pear engaging means.

3. A pear feed comprising means for supporting a promiscuous mass of pears, a receptacle, means for moving the receptacle through said promiscuous mass of pears to receive an individual pear therefrom, means in said receptacle for contacting a portion of a pear received thereby, means operatively associated with said receptacle moving means for turning said pear contacting means whereby a pear contacted thereby is caused to turn until its neck portion extends over the front wall of said receptacle in a predetermined oriented position relative to the receptacle, and means for engaging a portion of a pear extending from said receptacle in a direction other than over said front wall thereof to thereby shift said pear relative to the receptacle into contact with said pear contacting means.

4. A pear feed comprising an elevating receptacle adapted to receive an individual pear from a promiscuous mass thereof, a rotating roll in the bottom of the receptacle and adapted to contact a portion of a pear received thereby for turning said pear within said receptacle until the neck end of said pear extends from said receptacle over the front wall thereof, a kicker arm mounted for oscillation adjacent the rear wall of the receptacle, said kicker arm having a yoke portion at its end adapted to swing past the rear and side walls of said receptacle as the latter passes the same for engaging a portion of a pear overhanging the rear or side walls thereof, and means operatively associated with the elevating receptacle for swinging said kicker arm during movement of said receptacle past the same whereby a pear engaged thereby is shifted within said receptacle into contact with the rotating roll therein.

5. A pear feed comprising a receptacle adapted to receive and support an individual pear, means for moving the receptacle along a predetermined path, rotating means in the bottom of the receptacle for tractionally engaging a portion of the pear supported therein for turning said pear until its neck end overhangs the front wall thereof, a yoke pivotally mounted adjacent said predetermined path, and means for swinging said yoke past the rear and side walls of the receptacle as the latter passes said yoke to thereby engage a portion of a pear received by said receptacle with no portion of such pear contacting the rotating means therein, whereby said pear is moved within said receptacle into contact with said rotating means.

6. A pear feed comprising a receptacle adapted to receive and support an individual pear, a supply hopper having a promiscuous mass of pears therein, means for elevating the receptacle through said supply hopper for receiving an individual pear therefrom, said receptacle having a rotating roll associated therewith and adapted to contact a portion of the pear received thereby for swinging said pear within the receptacle until its neck end overlies the front wall thereof, and means movable relative to said receptacle as the latter is elevated therepast for engaging a pear having a portion thereof overhanging the rear or side walls of said receptacle whereby said pear is shifted within the same into contact with said rotating roll associated therewith.

7. A pear feed comprising a receptacle adapted to receive and support an individual pear therein and having a rotatable roll associated therewith adapted to engage a portion of the pear supported therein, means for moving the receptacle along a predetermined path and for rotating the roll associated therewith for turning and swinging a pear having a portion thereof contacting the same until its neck end comes to rest upon the front wall of said receptacle, means pivotally mounted adjacent the path of movement of the receptacle and having a yoke end adapted to swing past the side walls of said receptacle for engaging a portion of the pear supported therein but overhanging the side walls of the same, and means for swinging said yoke past said receptacle as the latter passes the same whereby pears having portions thereof overhanging the side walls of said receptacle are moved into contact with the rotating roll associated therewith.

8. A pear feed comprising a cup-shaped receptacle having a continuous upper edge interrupted at one point and downwardly inclined toward the same, a supply hopper having a promiscuous mass of pears therein, means for moving said receptacle through said hopper to receive an individual pear therefrom bulb end first, means associated with said receptacle for turning the pear received thereby so that the neck portion of said pear slides down said declining upper edge of the receptacle until it comes to rest at said interrupted point thereof, a yoke mounted for swinging movement into the path of said moving receptacle and adapted to engage any portion of the pear not confined within the same and extending therefrom beyond said continuous upper edge thereof to shift said pear into contact with said pear turning means, and means operable by said receptacle as it moves past said yoke for swinging the latter past said receptacle in the general direction of movement of the same.

9. A pear feed comprising a cup-shaped receptacle having a continuous upper edge interrupted at one point and downwardly declined toward the same, means for elevating said receptacle through a promiscuous mass of pears for receiving an individual pear therefrom, means in the bottom of said cup for contacting a portion of the pear received thereby and operatively associated with said elevating means for turning the pear until its neck portion is disposed in the interrupted point of the upper edge of the receptacle, means arranged adjacent the path of movement of said receptacle for movement with respect thereto in a direction substantially corresponding to the direction of movement of and at a speed greater than the elevation of said receptacle for engaging a pear having a portion thereof extending outwardly of the upper edge of the receptacle to thereby shift said pear relative to the latter and into engagement with said contacting means in the bottom of the same, and means operable incident to the elevation of said receptacle for moving said pear engaging means relative thereto.

10. In a pear feeding apparatus including a conveyor, a receptacle carried by said conveyor for movement therewith toward a point of discharge, said conveyor and receptacle having means associated therewith for turning a pear supported in said receptacle into a position with its neck portion extending in the direction of the front wall of said receptacle whereby the pears will be discharged therefrom in a predetermined manner, the combination therewith of: an arm having a yoke portion, means mounting said arm for movement relative to said receptacle to cause the yoke portion thereof to sweep past the rear and side walls of said receptacle, cam means operatively associated with said arm, and means on said conveyor for engaging said cam means for operating said arm whereby the yoke portion thereof is moved upwardly relative to said receptacle to engage a pear having a portion thereof extending beyond the rear and side walls thereof to thereby shift said pear into contact with said pear turning means.

11. In a pear feeding apparatus including a conveyor, a receptacle on said conveyor for movement therewith toward a point of discharge, said conveyor and receptacle having means associated therewith for turning a pear supported in said receptacle into a position with its neck portion extending in the direction of the front wall of said receptacle whereby the pears will be discharged therefrom in a predetermined manner, the combination therewith of: an arm having a yoke portion, means mounting said arm adjacent said conveyor for swinging movement relative to said receptacle to cause the yoke portion thereof to swing past the rear and side walls of the receptacle, a pinion mounted on said mounting means for rotation with said arm, a cam having a rack bar meshing with said pinion, and means on said conveyor and engageable with said cam to thereby move the rack bar relative to the pinion for swinging said arm whereby a pear supported in said receptacle but extending from the rear or either side wall thereof is engaged by the yoke portion of the arm and shifted into contact with said pear turning means.

12. In a pear feed including an elevator mechanism, a receptacle supported on said elevator mechanism and adapted to receive an individual pear from a promiscuous mass thereof while moving therethrough, means in said receptacle and operable with said elevator mechanism for turning pears in said receptacle until their neck ends extend in the direction of the front wall thereof, and means for engaging a pear having a portion thereof extending from said receptacle in the direction of the rear or side walls thereof to thereby shift said pear into a position to be influenced by said pear turning means.

13. In a pear feed including an elevator mechanism, a receptacle supported on said elevator mechanism and adapted to receive an individual pear from a promiscuous mass thereof while moving therethrough, means in said receptacle and operable with said elevator mechanism for turning the pear in said receptacle until its neck end extends in the direction of the front wall thereof, means for engaging a pear having a portion thereof extending from said receptacle in the direction of the rear or side walls thereof to thereby shift said pear into a position to be influenced by said pear turning means, said pear engaging means comprising a yoke pivotally mounted adjacent said elevator mechanism and movable past said receptacle in the direction of movement of the same, cam means operatively associated with said yoke and adapted when depressed to move the latter past said receptacle, and means on said elevator mechanism for depressing said cam means in timed relation with respect to the movement of said receptacle relative to said yoke.

14. In a pear feed including an elevator mechanism, a receptacle supported on said elevator mechanism for movement therewith and adapted to receive an individual pear from a promiscuous mass thereof while moving therethrough, means in said receptacle and operable with said elevator mechanism for turning the pear in said receptacle until its neck end extends in the direction of the front wall thereof, means for engaging a pear having a portion thereof extending from said receptacle in the direction of either the rear or side walls thereof to thereby shift said pear into a position to be influenced by said pear turning means, said pear engaging means comprising an arm having a yoke portion adapted to flank the rear and side walls of said receptacle when moved past the same, means mounting said arm for swinging movement adjacent said elevator mechanism, a rack and pinion associated with said arm, and means operatively associated with said elevator mechanism for moving said rack relative to said pinion for swinging said arm upwardly relative to said receptacle as the latter passes the arm mounting means.

15. In a pear feed including an elevator mechanism, a receptacle supported on said elevator mechanism for movement therewith and adapted to receive an individual pear from a promiscuous mass thereof while moving therethrough, means in the bottom of said receptacle and operable with said elevator mechanism for turning the pear in said receptacle until its neck end extends in the direction of the front wall thereof, means for engaging a pear having a portion thereof extending from said receptacle in the direction of either the rear or side walls thereof to thereby shift said pear into a position to be influenced by said pear turning means, said pear engaging means comprising an arm having a yoke adapted to flank the side walls of said receptacle from the rear thereof when moved past the same, means mounting said yoke for swinging movement adjacent said elevator mechanism, and means operatively associating said elevator mechanism with said yoke for swinging the latter past the receptacle as it approaches the same whereby to lift the portion of a pear engaged by said yoke causing the remaining portion of said pear to slide further into said receptacle for engagement with said pear turning means.

BURTON C. COONS.

REFERENCES CITED

The following references are of record in the file of this patent:

UNITED STATES PATENTS

| Number | Name | Date |
| --- | --- | --- |
| 580,742 | Vrooman et al. | Apr. 13, 1897 |